United States Patent [19]

Jones

[11] Patent Number: 4,867,488
[45] Date of Patent: Sep. 19, 1989

[54] RESTRAINED JOINT WITH GRIPPER GLAND

[75] Inventor: Lawrence S. Jones, Hueytown, Ala.

[73] Assignee: United States Pipe and Foundry Company, Birmingham, Ala.

[21] Appl. No.: 240,872

[22] Filed: Sep. 6, 1988

Related U.S. Application Data

[63] Continuation of Ser. No. 84,790, Aug. 13, 1987, abandoned.

[51] Int. Cl.$^4$ ............................................. F16L 25/00
[52] U.S. Cl. ...................................... 285/328; 285/55; 285/323; 285/337; 285/422; 285/374
[58] Field of Search ............... 285/337, 322, 323, 328, 285/55, 422, 374

[56] References Cited

U.S. PATENT DOCUMENTS

| | | | |
|---|---|---|---|
| 2,779,610 | 1/1957 | Risley | 285/323 |
| 2,787,479 | 4/1957 | Burns | 285/232 |
| 3,348,850 | 10/1967 | Scales | 277/101 |
| 3,384,392 | 5/1968 | Gilchrist | 285/105 |
| 3,594,023 | 7/1971 | Yano | 285/337 |
| 3,638,968 | 2/1972 | Barks | 285/328 X |
| 3,726,549 | 4/1973 | Bradley, Jr. | 285/356 |
| 3,733,093 | 5/1973 | Seiler | 285/342 |
| 3,937,500 | 2/1976 | Sato | 285/323 |
| 4,092,036 | 5/1978 | Sato et al. | 285/337 |
| 4,127,290 | 11/1978 | Mutschlechner | 285/343 |
| 4,183,560 | 1/1980 | Wyss | 285/232 |
| 4,372,587 | 2/1983 | Roche | 285/238 |
| 4,417,754 | 11/1983 | Yamaji et al. | 285/104 |
| 4,538,841 | 9/1985 | Royston | 285/337 |
| 4,569,542 | 2/1986 | Anderson et al. | 285/337 |
| 4,606,565 | 8/1986 | Royston | 285/337 |
| 4,610,471 | 9/1986 | Halen et al. | 285/337 |
| 4,648,633 | 3/1987 | Bergmann | 285/337 |

Primary Examiner—Dave W. Arola
Attorney, Agent, or Firm—James W. Grace; Charles W. Vanecek

[57] ABSTRACT

This invention pertains to bolted mechanical pipe joints using toothed gripper rings to prevent separation of the pipe.

10 Claims, 3 Drawing Sheets

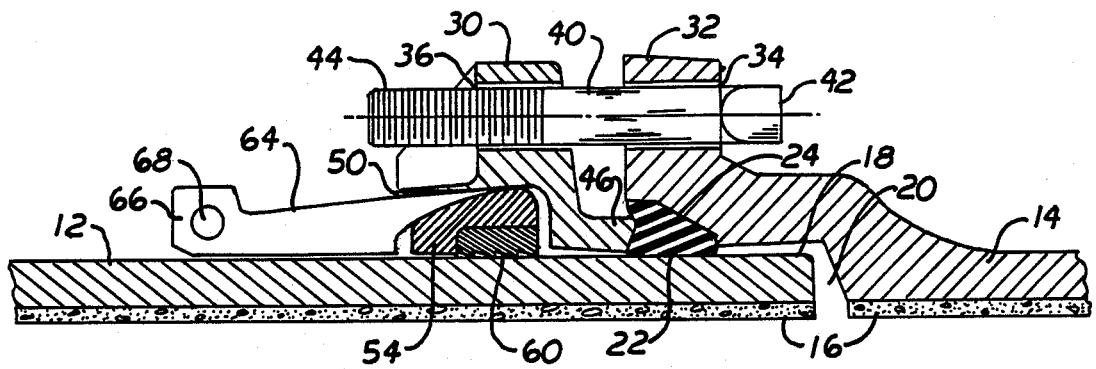
FIG. 2
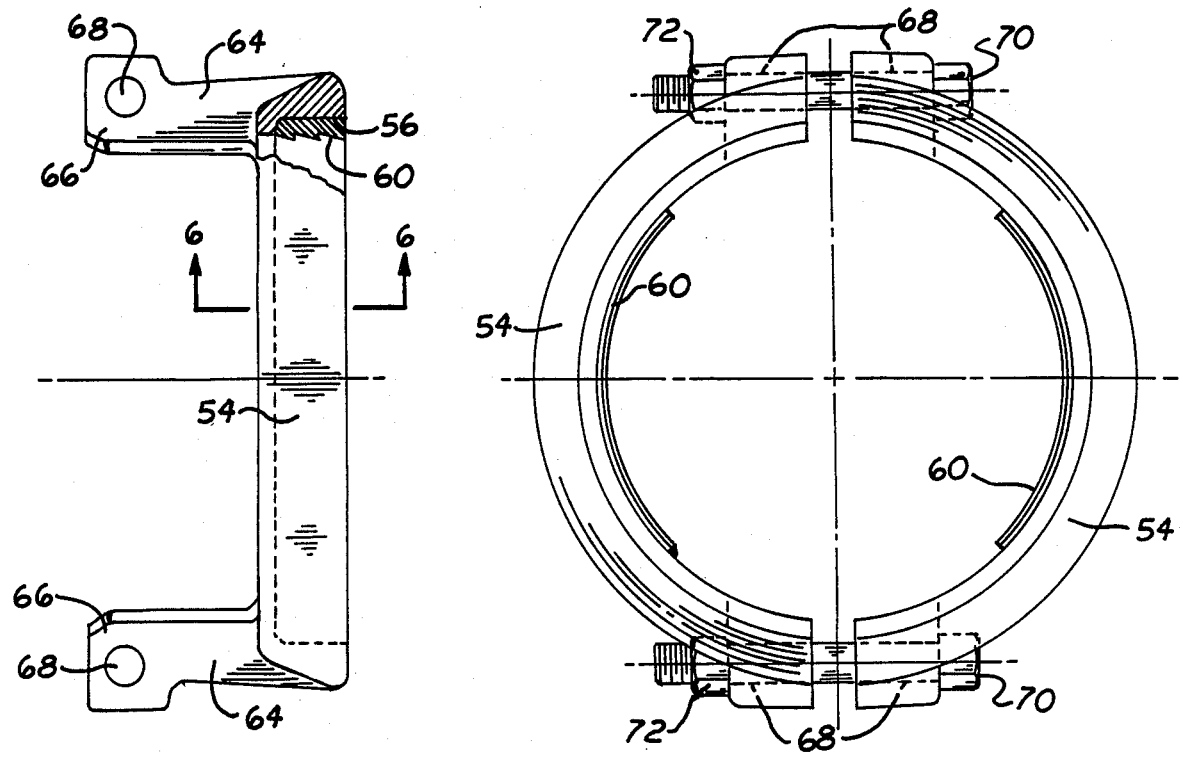
FIG. 5
FIG. 7
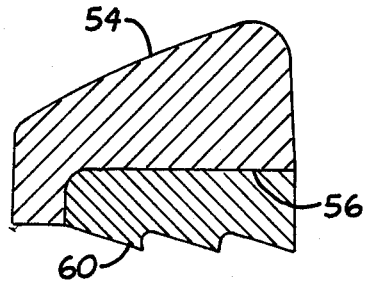
FIG. 6

RESTRAINED JOINT WITH GRIPPER GLAND

BACKGROUND OF THE INVENTION

This is a continuation of application Ser. No. 084,790 filed Aug. 13, 1987, now abandoned.

1. Field of the Invention

The present invention relates to pipe joints and particularly to bolted mechanical pipe joints in which two telescoped pipes are prevented from separation. The particular bolted mechanical joint uses T-bolts to secure a bell portion of one pipe to a mechanical joint gland which cooperates with toothed gripper rings to prevent separation of the pipe.

2. Description of the Prior Art

One of the most difficult problems in the field of water distribution is the prevention of joint separation and ultimately joint leakage from pipes which are carrying water under pressure. Numerous constructions have been devised to overcome this problem, but many of these constructions require special tools and skills to complete the job. One of the most common types of pressure joints is the mechanical joint which uses T-bolts along with additional parts to hold the pipes together.

A typical mechanical joint is shown in U.S. Pat. No. 4,417,754 which discloses a pipe joint for preventing separation comprising a holding member connectable to an annular outer flange formed at the end of a socket and surrounding the outer periphery of a spigot outside the socket, the holding member being annular or being adapted to form an annular shape, the holding member being provided on its inner periphery with a tapered surface increasing in diameter toward the socket; a stopper in the form of a ring divided at one portion and provided with an outer peripheral tapered surface increasing in diameter toward the socket and with engaging edges in circumferential rows on its inner periphery, the stopper being interposed between the tapered surface of the holding member and the spigot outer periphery; and tap bolts extending through the holding member at suitable portions along its circumference for pressing the stopper from outside against the spigot outer periphery. Because the stopper is thus shaped, the joint is easy to assemble and manufacture. When the spigot acts to slip off with the tap bolts tightened up, a diametrically constricting force acts on the spigot uniformly circumferentially thereof without any unevenness to reliably prevent separation of the spigot from the socket.

The difficulty with this structure is that the tap bolts used to press the stopper from the outside against the spigot outer periphery may be improperly installed and adjusted. The tap bolts are torqued to a specified amount. The setting of the torque requires a special wrench and a higher degree of care than the normal job of tightening bolts. In addition, rust on the tap bolts can result in erroneous torque readings.

With an insufficient torque level on the tap bolts, the holding member will not hold the required thrust load of the joint. With too great a torque level, the pipe wall and the inner cement lining can be damaged or destroyed.

SUMMARY OF THE INVENTION

The invention consists of a special annular, cast metal mechanical joint gland which has one or more axial slots at its inner diameter and has a spherical surface on its inner diameter. The gland contacts gripper ring segments at the spherical surface. A gripper ring segment is a ductile iron casting which has a spherical surface on the outer diameter and stainless steel inserts with hardened teeth on the inner surface. Two or more of the segments are used to form a loose gripper ring around the pipe circumference. The ring is normally made in two segments for the pipe diameters up to 20" and four segments for the larger diameters.

There are axial protrusions or handles at both ends of each segment. These protrusions allow for the segment handles to be maneuvered through the slots in the gland but prevent the segments from readily falling out of the gland. This arrangement aids in the installation and handling of the gland and gripper ring segment assembly.

The mechanical joint gland has an integral extension which abuts a gasket or annular packing which is held in a recess in the socket of the enclosing pipe. The entire assembly consisting of the mechanical joint gland and the gasket are positioned on the pipe spigot. The joint assembly is made by pulling a mechanical joint pipe or fitting bell up to the mechanical joint gland with conventional tee head bolts.

The bolting action of the mechanical joint gland assembly compresses the gasket to effect the joint seal. The gripper ring segments are then fastened together with bolts or other means to establish an initial bite to the teeth of the gripper ring. As the joint is pressurized, the joint separates slightly until the outer spherical surface of the gripper ring and the inner spherical surface of the gland contact. The wedging action causes the teeth to embed into the pipe barrel or spigot preventing any further separation of the joint.

With the gripper ring of the present invention, the thrust capability of the joint is a function of the design and is not controlled by the skill of the men who install the joint. In addition, the gripper ring of the present invention can be designed such that the load against the pipe barrel is limited, thereby eliminating damage to the pipe and lining.

It is therefore an object of the present invention to provide a novel restrained mechanical joint which is simple to install.

It is another object of the present invention to provide a novel restrained mechanical joint which is simple to install but requires no special tools.

Other objects and advantages of the present invention will become apparent to those skilled in the art from the following description taken in conjunction with the accompanying drawing in which like numerals represent like elements and in which:

FIG. 2 is a side elevation in longitudinal section showing the pipe joint of the present invention taken through a different section of the pipe joint.

FIG. 5 is a side elevational view of a gripper ring of the invention, partially cut-away.

FIG. 6 is an enlarged cross-sectional view of the gripper ring of FIG. 5 taken along lines 6—6 of FIG. 5, and FIG. 7 is an end elevational view of two gripper rings assembled for insertion around the periphery of the spigot of the pipe enclosed in the bell section of an outer pipe.

Figure 1:
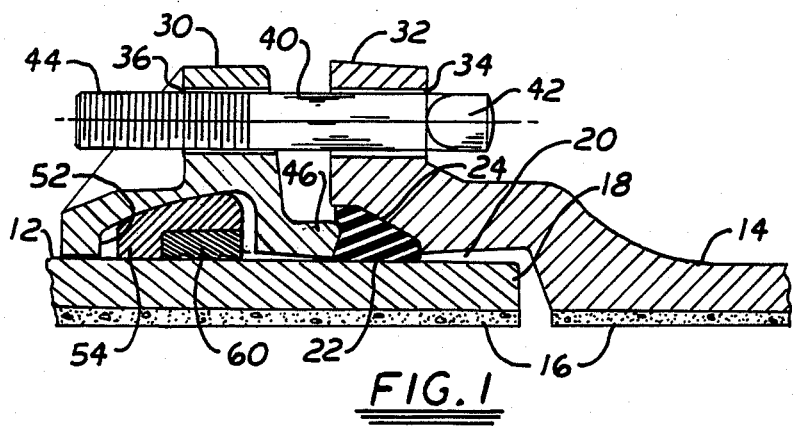
FIG. 1 is a side elevation in longitudinal section showing a pipe joint according to the present invention.

FIG. 1 is a cross-sectional view of the mechanical joint of the present invention showing two pipes 12 and 14 each with a cement lining 16. Pipe 12 has a spigot 18 which is inserted into the socket 20 of pipe 14 for connection. An annular packing or gasket 22 made of rubber or other resilient material is interposed between the outer periphery of spigot 18 and a tapered packing seat 24 formed on the inner periphery of the open end of socket 20 of pipe 14. An annular mechanical joint gland 30 surrounds the spigot 18 and is axially spaced from a raised portion 32 of the bell end of pipe 14. Bolt holes 34 are provided in the raised portion 32 of pipe 14 which correspond to bolt holes 36 in the mechanical joint gland 30. T-bolts 40 are inserted through bolt holes 34 with their heads 42 being of T-shape resting against one side of raised portion 32 and their threaded shanks 44 extending through holes 36 in the mechanical joint gland 30. Nuts (not shown) are installed over the threads in shanks 44 to secure mechanical joint gland 30 to the raised portion 32 of pipe 14. Mechanical joint gland 30 has an extension 46, integrally cast with the main portion of gland 30 and extending outwardly to mate with annular packing 22. When assembled and when nuts on T-bolts 40 (not shown) are tightened, mechanical joint gland 30 and the raised portion 32 of bell socket 20 are drawn together and extension 46 compresses annular packing 22 to effect a leak-tight condition for the mechanical joint.

The structure of the mechanical joint which has thus far been described is conventional and is fully in accordance with the American Standard for Rubber Gasket joints for ductile iron and gray iron pressure pipe and fittings in accordance with the America Water Works Association Standards ANSI/AWWA C111/A21.11-85.

The improvement of the present invention which prevents disengagement of the pipes 12 and 14 to prevent leakage at the joint will now be described.

Figure 4:
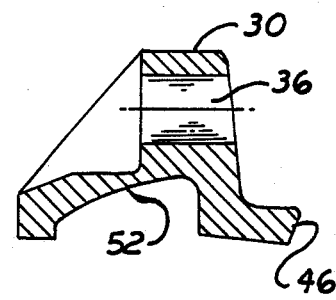
FIG. 4 is a cross-sectional view of the mechanical joint gland of the present invention taken along the lines 4—4 of FIG. 3.
Figure 3:
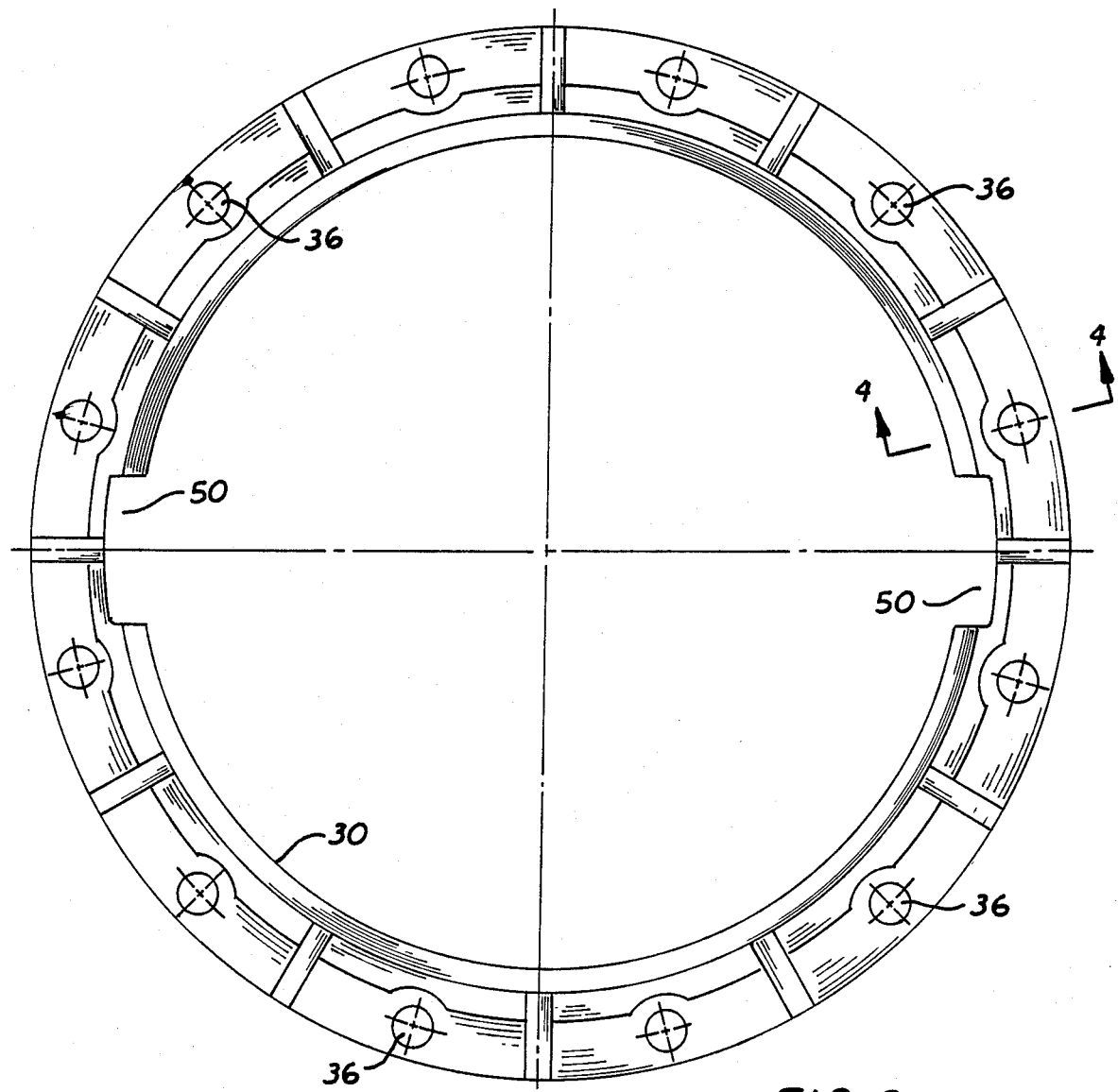
FIG. 3 is an end elevation of the mechanical joint gland of the invention.

Reference may be had to FIG. 3 which shows a mechanical joint gland similar to that shown in the ANSI-AWWA C111/A21.11-85 standards but differs therefrom in two respects. As shown in FIG. 3, the mechanical joint gland 30 of the invention is annular in shape and has at least two axial slots 50 on opposite sides of the gland and as shown in FIG. 4, the gland has a recess 52 which is a segment of a sphere. Axial slots 50 are adapted to permit axial protrusions or handles 64 of gripper ring segments 54 (see FIG. 5) to extend outside of mechanical joint gland 30. Recess 52 in the inner surface of mechanical gland 30 is contoured to accommodate the outer spherical surface of gripper ring segments 54. (See FIGS. 5, 6 and 7).

Reference may be had to FIG. 5 for a detailed description of a gripper ring segment 54. Gripper ring segment 54 comprises an arcuate cast iron segment having an inner cut-away section 56 which is designed to receive a stainless steel toothed insert 60. Extending axially, outwardly and away from the outer periphery of gripper ring segment are two handles or protrusions 64, one at each end of the segment. This design permits easy manipulation of the handles 64 through the slots 50 of gland 30 and prevent the segments from readily falling out of the gland. A fastener receiving or bolt hole 68 is cast integrally or drilled in protrusion 64 for the reception of fasteners or bolts 70 to hold two gripper ring segments 54 together to form a hollow ring having approximately the diameter of the spigot 18 of pipe 12. Insert 60 which is an elongated arcuate segment of stainless steel has an outer surface contoured to be received against the inner surface 56 of gripper ring segment 54 and is spot welded to said section. The toothed surface of insert 60 extends outwardly of the cut-away section 56 of gripper ring segment 54 and is adapted to penetrate the outer periphery of spigot 18 of pipe 12 when two gripper ring segments are placed over the outer periphery of spigot 18 and tightened into place. FIG. 7 shows the gripper ring segments 54 in assembled relationship after each gripper ring segment 60 is placed against the periphery of spigot 18 and bolts 70 are placed through holes 68. Nuts 72 are threaded over the ends of bolts 70 to hold the two gripper ring segments in assembled relationship.

For a more specific example, if it is desired to make a gripper ring segment for a spigot of a 4-inch pipe, the gripper ring segments have an inner radius of about 2.51 inches and so each gripper ring segment 54 will be about 7.5 inches long along its inner surface and the length of the toothed insert 60 is about 5 inches. Of course, for pipes of greater or less diameter these figures will vary.

In assembling the novel mechanical joint of the invention, ring segments 60 are placed loosely into cavity 52 of mechanical joint gland 30 with handles 64 protruding through slots 50. Bolts 70 are inserted into holes 68 in handles 64 of gripper ring segments 60 and nuts 72 are loosely threaded on bolts 68. Mechanical joint gland 30 with loosely installed ring segments 60 is slipped over the spigot end 18 of pipe 12 such that extension 46 is towards the end of spigot 18. Nuts 72 are tightened only enough to allow the assembled gripper ring and gland to move snuggly along the outer periphery of spigot 18. Annular packing or gasket 22 is inserted into packing seat 24 of bell socket 29 of pipe 14. The spigot end 18 of pipe 12 is pushed into socket 20 of pipe 14 until it is seated in the conventional manner. The joint assembly is sealed by pulling the mechanical joint gland 30 up to the mechanical joint pipe bell 14 and gasket 22 by tightening the nuts of the T-bolts. The bolting action of the gland compresses the gasket to effect the seal. The joint assembly is then restrained by tightening the gripper ring segments 54 with bolts 70 and nuts 72. The bolting action of the gripper ring segments provide an initial "bite" of the insert teeth into the pipe spigot surface. The wedging forces at the mating surfaces of the gripper ring and the gland force the teeth of the inserts into the pipe spigot to effect the restraint of the joint.

Figure 8:
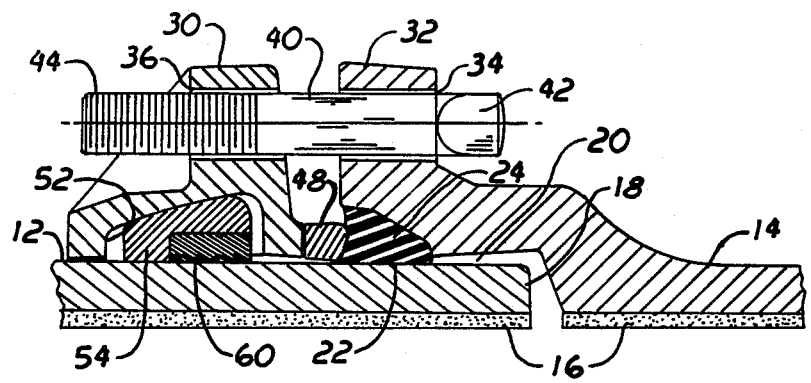
FIG. 8 is a side elevation in longitudinal section showing an alternative pipe joint according to the invention.

Obvious variations of certain elements of the invention can be made. For example, as shown in FIG. 8 the extension 46 which is shown as an integral part of mechanical joint gland 30 may be a separate annular ring 48 interposed between a surface of mechanical joint gland 30 and annular packing 22 or the extension 46 may be made part of the annular packing.

The mechanical joint gland 30 could be made in segments so that it could be assembled on a previously installed pipe which may be required when making taps or repairs to existing pipe lines.

The gripping surfaces of the ring segments 54 could be made with an abrasive media such as sand or silicon carbide bonded to the inner surface of the casting.

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

I claim:

1. A pipe joint for preventing separation of telescoped pipes wherein an annular packing is provided between a packing seat formed on the inner periphery of a socket member and the outer periphery of a spigot, the pipe joint comprising: a first pipe having a socket and a second pipe having a spigot, said spigot being inserted into said socket, said socket having an outwardly radially extending raised portion, said raised portion having radially spaced fastener receiving holes, said socket further having an annular packing receiving seat along its inner surface facing said spigot, an annular packing inserted into said annular packing receiving seat, an annular mechanical joint gland having an extension integral therewith along one face thereof and extending axially toward and abutting said annular packing, said gland having a radially extending raised portion having radially spaced fastener receiving holes aligned with said fastener receiving holes of said raised portion of said socket, said gland having a recess along its inner radial surface adapted to receive gripper ring segments, said recess having an uninterrupted radially inwardly facing surface, at least two arcuate gripper ring segments positioned in said recess and having locking elements secured in a recess along their inner surface, said locking elements being adapted to lockingly engage said spigot, means for securing said gripper ring segments together in the form of a ring to enclose said spigot, and fastening means inserted into said fastener receiving holes in said raised portion of said socket and said raised portion of said gland, whereby upon tightening of said fastening means, said locking elements engage said spigot to prevent separation of said mechanical joint and said extension compresses said annular packing to form a seal between said spigot and said socket.

2. A pipe joint for preventing separation of telescoped pipes as recited in claim 1 in which said mechanical joint gland is a unitary annular element.

3. A pipe joint for preventing separation of telescoped pipes as recited in claim 1 in which said mechanical joint gland is made of separate sections capable of being assembled into a unitary annular element.

4. A pipe joint for preventing separation of telescoped pipes as recited in claim 1 in which said mechanical joint gland has at least two radially spaced slots along its inner surface adapted to receive protrusions of said gripper ring segments and each of said gripper ring segments has protrusions extending axially away from the outer periphery of said gripper ring assemblies and through said slots in said mechanical joint gland, said protrusions being parts of said means for securing said gripper ring segments together.

5. A pipe joint for preventing separation of telescoped pipes as recited in claim 4 in which said protrusions of said gripper ring segments have fastener receiving holes therein.

6. A pipe joint for preventing separation of pipes as recited in claim 5 in which fasteners are inserted through said fastener receiving holes to assemble said gripper ring segments into a unified annular ring.

7. A pipe joint for preventing separation of pipes as recited in claim 1 in which said recess in said gland has a contour with a widening configuration toward said socket and the outer periphery of said gripper ring segments is adapted to conform to the contour of said recess in said gland.

8. A pipe joint for preventing separation of pipes as recited in claim 1 in which said locking elements are stainless steel elements with exposed teeth.

9. A pipe joint for preventing separation of pipes as recited in claim 1 in which said locking elements have exposed surfaces of an abrasive media.

10. A pipe joint for preventing separation of telescoped pipes wherein an annular packing is provided between a packing seat formed on the inner periphery of a socket member and the outer periphery of a spigot, the pipe joint comprising: a first pipe having a socket and a second pipe having a spigot, said spigot being inserted into said socket, said socket having an outwardly radially extending raised portion, said raised portion having radially spaced fastener receiving holes, said socket further having an annular packing receiving seat along its inner surface facing said spigot, an annular packing inserted into said annular packing receiving seat, an annular ring surrounding said spigot, said annular ring having a first face adapted to abut said annular packing and a second face located away from said first face, an annular mechanical joint gland having a face adapted to abut said second face of said annular ring and further having a radially extending raised portion, said raised portion having radially spaced fastener receiving holes aligned with said fastener receiving holes of said raised portion of said socket, said gland having a recess along its inner radial surface adapted to receive gripper ring segments, said recess having an uninterrupted radially inwardly facing surface, at least two arcuate gripper ring segments positioned in said recess and having locking elements secured in a recess along their inner surface, said locking elements being adapted to lockingly engage said spigot, means for securing said gripper ring segments together in the form of a ring to enclose said spigot, and fastening means inserted into said fastener receiving holes in said raised portion of said socket and said raised portion of said gland, whereby upon tightening of said fastening means, said locking elements engage said spigot to prevent separation of said mechanical joint and said extension compresses said annular packing to form a seal between said spigot and said socket.

* * * * *